J. L. DONAT.
PLUMBING FIXTURE.
APPLICATION FILED JULY 29, 1909.

959,207.

Patented May 24, 1910.

Witnesses
H. R. L. White
R. A. White

Inventor
Joseph L. Donat
By Foree Bain and May
Attys

UNITED STATES PATENT OFFICE.

JOSEPH L. DONAT, OF CHICAGO, ILLINOIS.

PLUMBING-FIXTURE.

959,207.   Specification of Letters Patent.   Patented May 24, 1910.

Application filed July 29, 1909. Serial No. 510,259.

*To all whom it may concern:*

Be it known that I, JOSEPH L. DONAT, a citizen of the United States, residing at Chicago, in the county of Cook and State of Illinois, have invented certain new and useful Improvements in Plumbing-Fixtures, of which the following is a specification.

My invention has for its object to provide an improved plumbing fixture, providing in a unitary structure properly related pipes or conduits and openings for use in single floor plumbing, as a small house, or an apartment with individual plumbing, to supply appropriate vent and drainage connections for a soil-pipe and for pipes from one or more independent sources of waste, such as a bath-tub and a sink, or the like.

Figure 1:
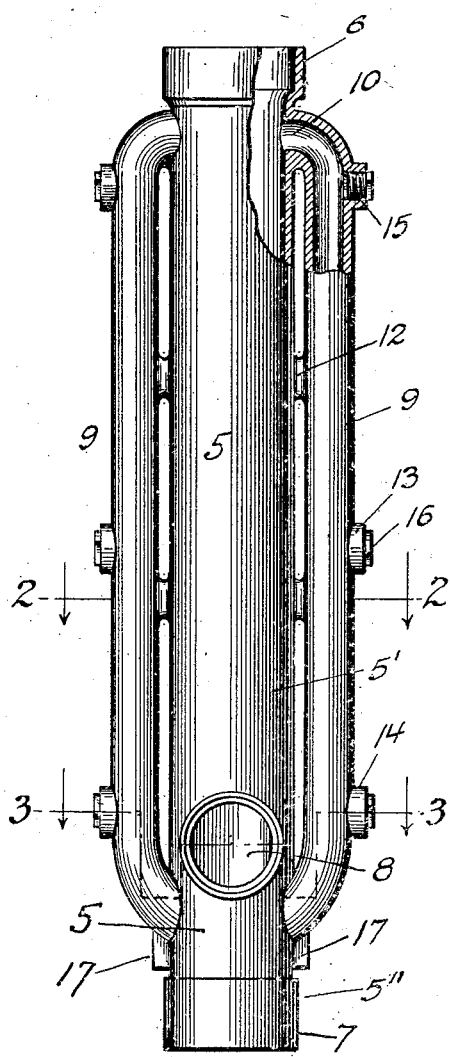
Figure 2:
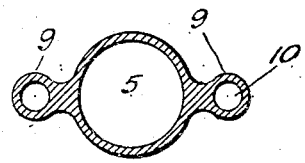
Figure 3:
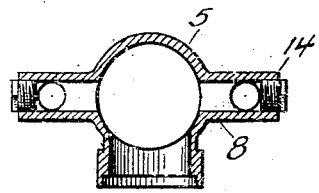

In the drawings, Figure 1 is a front elevation of an embodiment of my invention; Fig. 2 is a section on line 2—2 thereof; and Fig. 3 is a section on line 3—3 thereof.

In the embodiment of my invention, I provide an integral structure, a straight stack or pipe-main, 5, preferably having terminals, 6 and 7, at its ends for connection with the contiguous lengths of piping, and having communicating therewith a main opening, 8, for connection with the soil-pipe of the water-closet. The portion, 5', of the conduit 5 above the opening 8 communicates with and itself forms a part of the vent piping extending to the exterior air, while the portion, 5'', below said opening 8 communicates with and forms a part of the waste or drainage piping.

In unitary connection with the stack 5, I provide one or more branch pipes, 9, each opening at its upper end, as at 10, to the vent portion 5' of the main stack adjacent its upper extremity, and each opening at its lower end, as at 11, to the drainage or waste end 5'' of the main pipe adjacent the level of the main opening 8.

In the specific construction shown, I have illustrated the fitting as providing two diametrically opposed branch pipes, and such particular form will meet a wide commercial demand, but one or a greater number of branch pipes might be employed within the spirit of my invention.

Each branch pipe 9 is throughout its vertical extent, save at its ends, inclosed independently of the wall of the main pipe, but is preferably braced therefrom for strength by integral webs or braces, 12, at suitable intervals.

Connection stubs, 13, 14, and 15, are provided in each branch pipe 9 at different levels suitable for vent connections with washstands and sinks, and for waste and vent connection with the bath-tub; each stub, in the commercial article, being preferably provided with a plug, 16.

At the points where the branch pipes curve in at their lower ends to meet the vertical main conduit, rests, 17, may conveniently be provided, although this is not necessary.

In the installation of the fitting as above described, only one source of drainage is connected to each branch pipe. In a single story dwelling, for instance, the end 5' of the main stack is vented through the roof by direct piping connections and the end 5'' is connected with the sewer system, the main opening 8 having connected therewith the closet, while the main basin may have vent connection to an upper stub of the one branch pipe, and the bath-tub connected for drainage and venting to the lower stub of the other branch pipe.

It will be apparent to those skilled in the art that the structure described provides properly vented connections for the several sources of drainage referred to in a unitary structure, which may be of relatively small size which conforms to all plumbing requirements of boards of health of many large cities, and which is capable of the satisfactory performance of all the necessary functions of a vented plumbing insulation.

From a practical standpoint, my fitting is very advantageous in its cheapness of construction, strength, lightness, and above all in the facility with which it may be installed, as the joints necessary to be effected for complete installation are of minimum number and of the simplest possible character.

Having thus described my invention, what I claim is:

1. A unitary plumbing fitting comprising a straight main stack provided with a main opening and adapted to constitute part of both the waste and vent pipes; and a branch pipe, integral therewith, communicating with the waste and the vent ends of the main stack, and provided with one or more stubs for connection with sources of drainage.

2. A plumbing fitting comprising in an integral structure a continuous main stack having a main opening therein adjacent its lower end and a branch pipe in open communication with said main pipe adjacent its two ends only, and provided with an opening for connection with a source of drainage.

3. A plumbing fitting comprising in a unitary, single-piece structure, a straight main pipe of relatively large diameter having adjacent its lower end a main opening, and a branch pipe communicating at both ends with the main pipe adjacent the ends of the latter and completely inclosed throughout its length independently of the main pipe, there being one or more openings to the branch pipe.

4. A fitting of the character described, comprising in a single-piece structure, a straight main pipe, a plurality of branch pipes spaced apart from said main pipe except at their ends, at their upper ends opening to said main pipe adjacent its upper end, and at their lower ends independently opening to the lower end portion of the main pipe, there being drainage openings to said branch pipes and a main drainage opening to the main pipe adjacent the lower ends of the branch pipes.

In testimony whereof I hereunto set my hand in the presence of two witnesses.

JOSEPH L. DONAT.

In the presence of—
W. LINN ALLEN,
MARY F. ALLEN.